May 4, 1965
R. G. JENNINGS
3,181,839
METHOD AND APPARATUS FOR PRE-EXPANSION
OF PLASTIC FOAMS
Filed Aug. 13, 1963
2 Sheets-Sheet 1
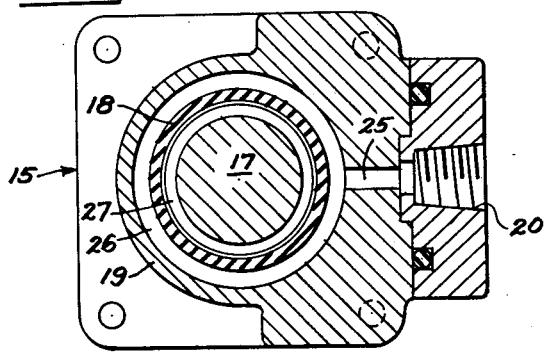
Fig. 3.
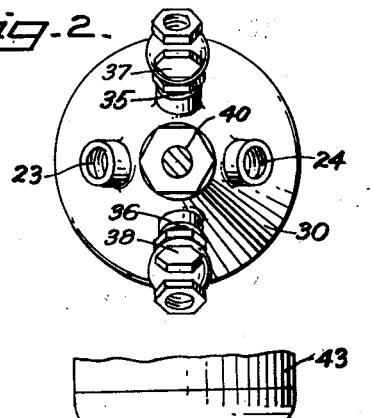
Fig. 2.
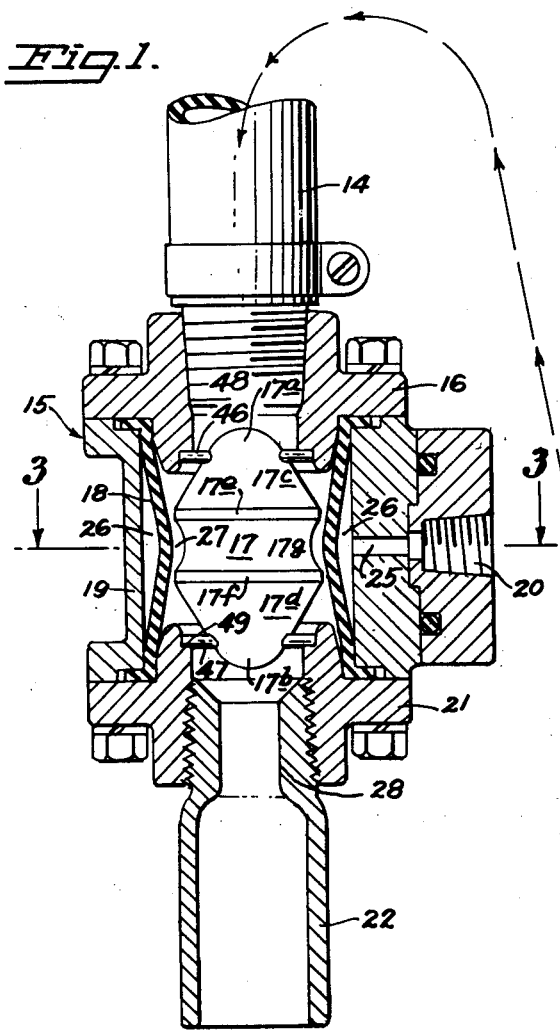
Fig. 1.
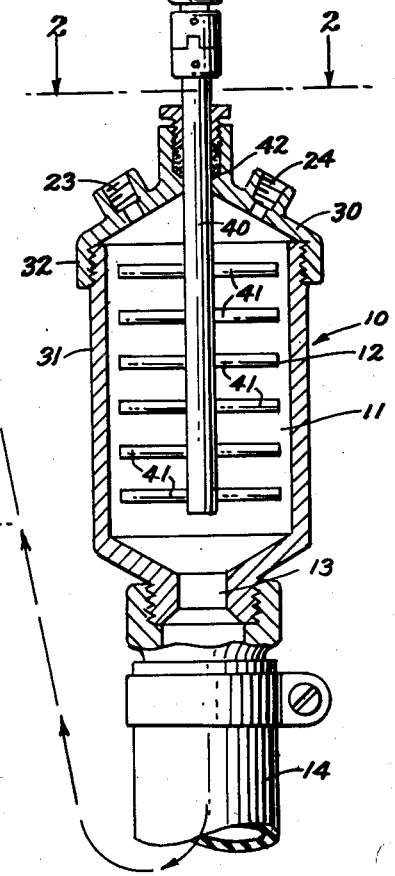
INVENTOR.
ROGER G. JENNINGS
BY
Owen, Wickersham & Erickson
ATTORNEYS

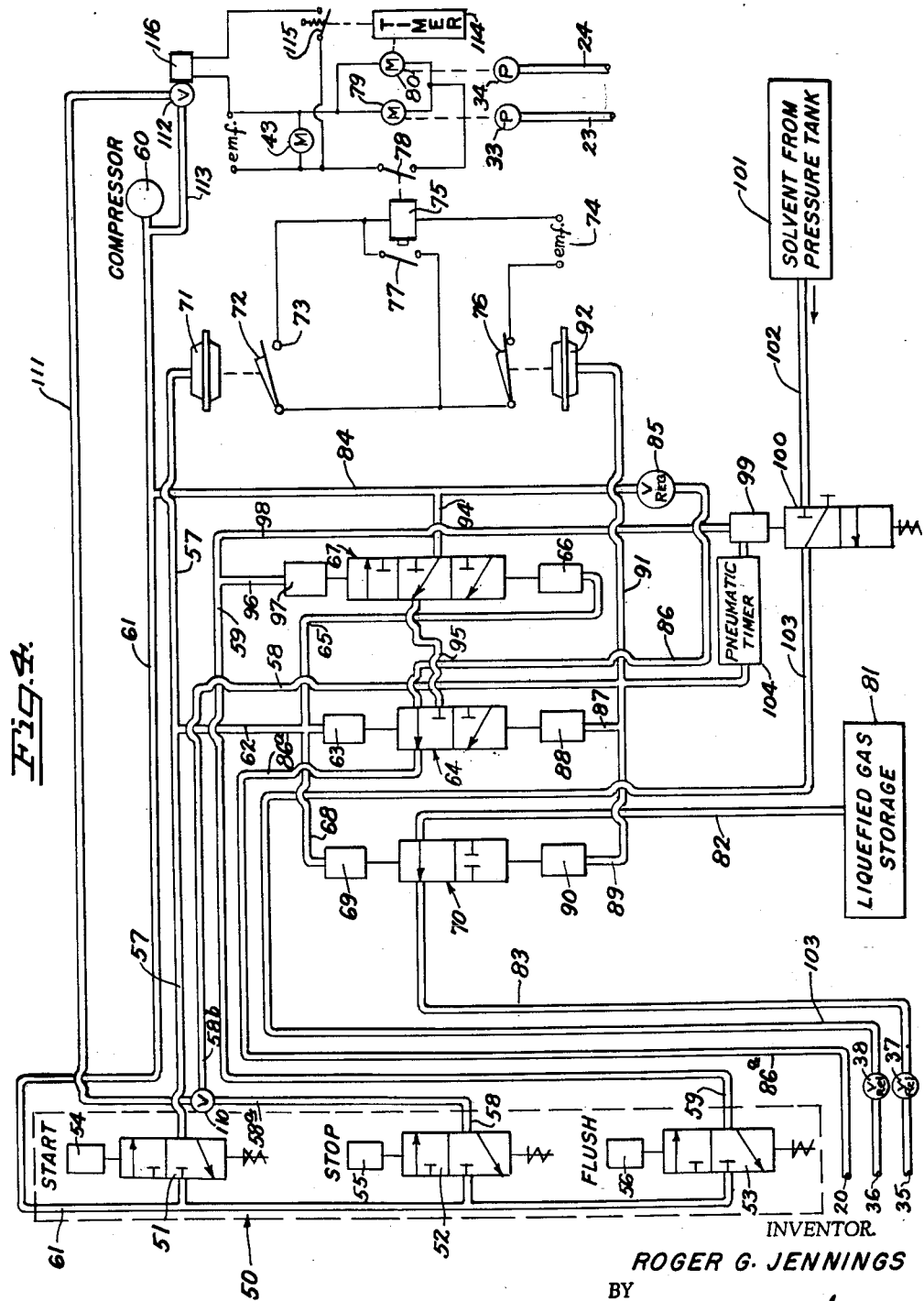

United States Patent Office 3,181,839
Patented May 4, 1965

3,181,839
METHOD AND APPARATUS FOR PRE-EXPANSION OF PLASTIC FOAMS
Roger G. Jennings, Berkeley, Calif., assignor to Pacific Vegetable Oil Corporation, San Francisco, Calif., a corporation of California
Filed Aug. 13, 1963, Ser. No. 301,821
8 Claims. (Cl. 259—8)

This invention relates to improvements in the froth or pre-expansion method of processing cellular plastic materials and to improvements in the apparatus therefor. More particularly, it relates to reducing the waste in plastic material between successive applications and the achievement of maximum uniformity of the foam at a minimum expenditure of time and labor.

In the froth technique of making articles from plastic foam, such as polyurethane foam, the foam is pre-expanded and delivered in a fluid state into a mold or other shaping device, where it hardens. The froth technique is distinguished from the "foam-in-place" technique, in which the foaming takes place only within the shaping device after delivery to it of the ingredients.

Two important problems in the froth technique are how to control accurately the pressure within the mixing head and how to control the flow of materials from the mixing head at the will of the operator. The control of flow and pressure has been made more difficult than normal because the pressure within the mixing head has extruded the froth through the pressure control device after the equipment has been shut down. Not only is this extruded material wasted; in addition the mixing head has to be refilled with materials before the next application of foam. Further, it has been found that the foam resulting from components that are mixed prior to the complete filling of the mixing head is inferior in quality to that produced under constant conditions of mixing head pressure, so that for the best results some of the freshly mixed material must be discarded each time the mixing head is filled.

As the mixing head may be cumbersome and not readily portable, a flexible hose is often attached to the mixing device to conduct the blended components of the foam to a distant point. When this is done, the hose, in addition to the mixing chamber, must be filled with the blended components prior to the production of satisfactory foam, and the extrusion of product after shutdown virtually empties both the mixing chamber and the hose. The cellular plastic may have a materials cost of 40 to 75 cents per pound, the mixing chamber and hose typically hold about one to five pounds of foam, and typical operations call for only about one minute of operation each time, with a shutdown for at least a few seconds and up to about a minute before the next operation. Hence shutdown and start-up operations have been very costly. When the mold or other shaping device has been small relative to the product of the pre-expansion ratio and the volume of the mixing device and the hose, the losses have been prohibitively costly, particularly for repetitive operations and have reduced the competitive ability of polyurethane foam produced by the froth method.

Another problem is that the components tend to solidify in the mixing head when the flow of the components to it has been stopped. With the exact time depending upon the type of cellular plastic produced by the mixing device and the rate of reaction between the components, the solidification time ranges from fifteen seconds to five minutes or more. To prevent solidification it is desirable to flush out the mixing chamber and hose with solvents for the components, such as aliphatic ketones or glycol ethers. Moreover, difficulties have been caused by not flushing soon enough.

I have found that it is preferable to clean out the unreacted or partially-reacted compounds from the mixing device and hose when the components are in their completely expanded state, in order to get rapid cleaning and minimum use of the expensive solvents. In addition, I have found that the operator of the mixing head often forgets to reduce the pressure in the mixing device and sometimes even forgets to flush the mixing device with the solvents.

Accordingly, an important object of my invention is to deliver a homogeneous plastic foam to the mold, and to maintain the homogeneity during start-up operations and during repetitive filling of many similar or dissimilar molds.

Another object is to provide a device for producing a plastic foam with minimum waste of raw materials.

Still another object is to improve the cleaning of the mixing chamber subsequent to its use and to do so with minimum operator attention.

Another object is to minimize the risk of improper cleaning and to minimize the amount of cleaning solvent used in cleaning.

I have discovered that these and other problems heretofore encountered in the production of pre-expanded plastic foam can be overcome by conducting a mixture of the components of the plastic foam from a pressurized mixing tank to a novel type flow restricting device (either directly or via a hose or pipe). In my invention the flow restricting device is controlled to provide two different stages of pressure restriction as well as being completely openable, and the stages and the opening are automatically controlled when the operator starts and stops the flow of materials to the mixing device. Cleaning out the chamber by solvent flushing is push-button controlled in this invention.

Other objects and advantages of my invention will become apparent from the following description and the accompanying drawings in which:

FIG. 1 is a view in side elevation and in section of a mixing device connected to a pneumatically controlled flow restricting device by a flexible hose, all embodying the principles of this invention, the hose being broken to conserve space;

FIG. 2 is a view in section taken along the line 2—2 in FIG. 1, showing the top of the mixing device;

FIG. 3 is a view in section taken along the line 3—3 in FIG. 1; and

FIG. 4 is a schematic diagram of the control system of this invention.

*General description of the plastic mixing and dispensing device*

The froth-producing device 10 shown in FIG. 1 comprises a pressurized mixing chamber 11 containing a rotatable mixer 12 and having an outlet passageway 13. The passageway 13 may be connected directly or by a hose 14 to a pressure-reducing valve 15 having an inlet-connecting flange 16, a central core 17, a rubber sleeve 18, an outer pressure-proof housing 19, a pneumatic fitting 20, and an outlet-connecting flange 21. The outlet flange 21 of the pressure-reducing valve 15 is connected to an injection nozzle 22.

Before describing the device in detail, the operation will be indicated briefly. The components of the plastic are introduced through inlets 23 and 24 into the upper end of the mixing chamber 11, along with liquefied foaming gas through an inlet 35, where they are mixed under sufficient pressure to maintain a liquid or only slightly expanded while being rapidly but thoroughly agitated by the rotating mixer 12, producing a homogeneous composition. This mixed composition is then forced through the passageway 13 and conducted to the pressure reducing valve 15. Pneumatic or hydraulic pressure is applied to the fitting 20 by means of the system of FIG. 4, and air or liquid passes through an inlet 25 into a chamber 26 around the outer surface of the rubber sleeve 18, thus causing restriction of a passage 27 between the sleeve 18 and the core 17. The pressure in the chamber 26 is applied uniformly around the periphery of the rubber sleeve 18, and this application of pressure brings the components flowing through the valve 15 to a pressure just above atmospheric so that the mixture expands into a froth. The froth then further expands in passing through a venturi-like opening 28 in the injection nozzle 22.

The mixing chamber 11

The mixing chamber 11 may be defined by an upper housing member 30 and a lower housing portion 31, joined together in a separable manner, as by threads 32, thus providing access to the interior of the chamber 11, and enabling removal of the mixer 12. The components of the plastic are introduced under pressure into the mixing chamber 11 through the inlets 23 and 24 in the upper part of the upper housing member 30. Suitable liquid pumps 33 and 34 (FIG. 4) well known in the art can be used to force the liquid components into the chamber 11. A third inlet 35 is used for dichlorodifluoromethane or Freon-12 or other liquefied foaming gas, and a fourth inlet 36 is provided for introduction of solvent for cleaning the chamber 11, hose 14, and passage 27 while the housings 30 and 31 are assembled. The inlet valves 35 and 36 are each equipped with a relief type check valve 37, 38.

The rotatable mixer 12 may comprise a shaft 40 to which are attached a number of pins or blades 41. The shaft 40 is mounted vertically in the center of the chamber 11 and is preferably journaled for rotation in at least an upper bearing 42 in the housing member 30. The shaft 40 is rotated by a suitable external power source, such as an electric motor 43, so that the pins 41 thoroughly blend the plastic components in the chamber 11. Throughout the operation of the device, the pressure in the chamber 11 is maintained at a level sufficient to prevent separation of the plastic components or substantial boiling of any liquid used for expansion of the mixture, by proper regulation of the width of the passage 27 by the pressure in the chamber 26.

The pressure reducing valve or flow restricting device 15

The tapered outlet 13 leads from the center of the bottom of the lower housing member 31 to the hose 14, which in turn is connected to the connecting flange 16 of the pressure-reducing valve 15. In the valve 15 the flow is accelerated due to a venturi action. When pneumatic or hydraulic pressure is applied to the fitting 20 and into the annular chamber 26 between the rubber sleeve 18 and the outer housing 19, that pressure tends to compress the sleeve 18 about the central core 17. Such compression increases the pressure required in order to force the mixed components between the central core 17 and the sleeve 18. It can thus be seen that an increase in applied pneumatic or hydraulic pressure to the fitting 20 increases the pressure in the mixing chamber 11, and, conversely, a decrease in that applied pressure decreases the pressure in the mixing chamber 11.

At zero pressure in the chamber 26, the sleeve 18 is substantially cylindrical. As the pneumatic or hydraulic pressure is increased from zero to a suitable value, the rubber sleeve 18 assumes the position shown in FIG. 1 at relatively low operating pressures; and upon further pressure increases it progressively decreases the annular clearance 27 about the central core 17 until the sleeve 18 comes into contact with the core 17. Thus by variation of the pressure applied to the fitting 20, virtually any pressure may be established in the mixing chamber 11. Pneumatic or hydraulic application of force to the annular ring 18 is preferred to direct mechanical means, due to the even distribution of pressure around the circumference, the small physical size of the pneumatic or hydraulic control unit, and the adaptability of such control to remote and accurate adjustment.

The core 17 has rounded ends 17a and 17b on conical noses 17c and 17d. The conical noses 17c and 17d end at short cylindrical portions 17e and 17f, between which is a central concave portion 17g. The core 17 is mounted loosely in the valve 15 and is self-centering, i.e., centered by the fluid passing around it. One of each of a pair of diametral rods 46, 47 passes through each nose 17c and 17d for engagement with shoulders 48 and 49 in the fittings 16 and 21, thereby preventing axial displacement of the core 17 without affecting its radial self-centering.

The control means 50

FIG. 4 depicts schematically the automatic control device 50 for the mixing chamber pressure. Mounted at or near the mixing device 10 within easy reach of the operator are three normally closed pushbutton-controlled pneumatic valves 51, 52 and 53 with pushbuttons 54, 55 and 56. Small flexible hoses 57, 58 and 59, which may be cabled together, lead from the valves 51, 52 and 53 pushbuttons to the devices controlled thereby.

Compressed air at approximately 100 p.s.i.g. from a compressor 60 is led through a hose 61 to each of the three valves 51, 52, 53. A momentary depression of the start pushbutton 54 causes the valve 51 to assume its open position (instead of the normal closed position shown in FIG. 4) and applies momentary air pressure through the hose 57 to a hose 62, which in turn applies pressure: (1) to a pilot cap 63 that moves a three-way pneumatic valve 64 to its open position (shown in FIG. 4), (2) via a hose 65 to a pilot cap 66 that moves a three-way pneumatic valve 67 to its open position (shown in FIG. 4); and (3) via a hose 68 to a pilot cap 69 that moves a three-way pneumatic valve 70 to its open position (shown in FIG. 4). The hose 57 also applies pressure to the diaphragm 71 of a pressure switch 72, closing the switch 72 against an electrical contact 73, so that current from an E.M.F. 74 flows through and energizes a relay 75, the flow being through a normally closed second pressure-actuated switch 76. Energization of the relay 75 actuates and closes a locking or holding switch 77 that keeps the relay 75 energized after release of the pushbutton 54. As long as the relay 75 is energized, it holds a switch 78 closed, so that current flows to and operates motors 79 and 80 that operate pumps 33 and 34, which send the two liquid components of the plastic into the mixing chamber 11 through the inlets 23 and 24. Dichlorodifluoromethane or other blowing agent passes from a storage container 81 via a conduit 82 through the now-opened valve 70 and a conduit 83 and the relief valve 37 to the inlet 35. Meanwhile, air from the compressor 60 passes via a conduit 84, a pressure regulator 85, a conduit 86, the open valve 64 and a conduit 86a to the fitting 20, sending a regulated low pressure to the chamber 26 to hold the sleeve 18 in the position shown in FIG. 1. As a result the ingredients are mixed under pressure in the chamber 11, and pass through the flow restricting device 15 to deliver foam to the injection nozzle 22.

At this stage, the fact that the valve 67 is open means nothing, since the passage of air therefrom is blocked by the valve 64.

When the desired quantity of froth has been delivered to the mold or shaping fixture, the stop pushbutton 55 for the air valve 52 is depressed momentarily, providing momentary air pressure through the hose 58. This sends a blast of air (1) via a hose 87 to a second pilot cap 88 of the valve 64, moving the valve 64, (2) via a hose 89 to a pilot cap 90 for the valve 70, closing the valve 70 and closing off the supply of blowing gas, and (3) through a hose 91 to a diaphragm 92 to open the pressure switch 76, opening the relay 75 and stopping the pumps 33 and 34, thus stoping flow of all the components to the mixing chamber 11. The valve 64 now passes unregulated air at full compressor strength (coming from the compressor 60 via conduits 84, 94, valve 67, conduit 95, the valve 64, and the conduit 86a) to the fitting 20. Air pressures over 80 p.s.i.g. close the sleeve 18 against the core 17 and prevent extrusion of the contents of the mixing head through the valve 15, when dichlorodifluoromethane is used as the foaming gas. If a different foam-in gas is used, there will be a pressure for obtaining similar content, and the setting can be changed if necessary.

If it is desired to dispense foam again prior to the solidification time of the components in the mixing chamber 11, the start button 54 may again be depressed initiating the previous sequence, resulting in immediate production of a homogeneous froth foam, due to the fact that the mixing chamber 11 and valve 15 are completely full of liquid mixed components.

If, on the other hand, it is desired to flush the mixing chamber 11, hose 14, and valve 15, the flush pushbutton 56 is depressed causing its valve 53 to open, and applying air pressure through the hose 59. This pressure passes (1) by a hose 96 to a pilot cap 97 of the valve 67, closing that valve and bleeding off the air pressure to the fitting 20, letting the liquid pressure in the hose 14 open the valve 15, and (2) by a hose 98 to a pilot cap 99 of a normally spring urged valve 100, which remains open so long as the pushbutton 56 is depressed, sending flushing liquid from a pressure tank 101 through conduits 102, the valve 100 and conduit 103 to the inlet 36.

Thus solvent from the pressure tank 101 is introduced into the mixing chamber 11 through the check-valve 37, thus effecting complete cleanout of the chamber. When the pushbutton 56 is released and resumes its normal position, the valve 101 closes and flow of solvent ceases.

Thus the following sequence of events may summarize operation:

(1) The operator depresses the start button 54.
(2) The flow restriction valve 15 moves to the position set by the pressure on the regulator 85.
(3) The flow of the plastic and Freon components begins to the mixing chamber 11.
(4) The desired amount of foam is dispensed.
(5) The operator depresses the stop button 55.
(6) The restriction valve 15 closes tightly at high pressure.
(7) The delivery of components ceases.
(8) The operator again repeats step (1).
(9) The flow restriction valve 15 reopens to the pressure set on the regulator 85.
(10) Operations (3) through (7) are repeated.
(11) The operator depresses the flush button 56.
(12) The restriction valve 15 opens completely.
(13) The contents of the mixing chamber 11 discharge.
(14) The flow of solvent starts and is continued until the device 10 is clean.
(15) The flush button 56 is released.
(16) The mixing device 10 is ready for operation (1).

A pneumatic timing device 104, connected to the line 58, may be substituted for or may supplement the flush button 56, to give automatic flushing after a certain amount of time elapses following cessation of delivery of components.

In some installations it is preferred to limit the "on" time for a predetermined maximum time. If the operator presses the stop button 55 before that time has run, the flow stops; but if he does not, then an automatic stop cuts off the flow of material. This may be done by providing a shuttle valve 110 in the stop circuit 58 between the valve 52 and the pneumatically actuated devices 88, 90, 92, and 104. A portion 58a of the conduit 58 leads from the valve 52 to the shuttle valve 110 and a portion 58b leads out from it. Opposite the portion 58a a conduit 111 is connected to the shuttle valve 110. A blast of air from conduit portion 58a (when the valve 52 is opened momentarily) actuates the shuttle valve 110 to shut off the conduit 111 and air passes from the conduit portion 58a to the conduit portion 58b. Also, a blast of air from the conduit 111 actuates the shuttle valve 110 to shut off the conduit portion 58a and send that blast of air to the conduit portion 58b.

The conduit 111 is connected at its other end to a normally closed solenoid valve 112 which is connected by a conduit 113 to the compressor 60. A timer 114 is actuated by the motor 80 every time the motor 80 is turned on by closure of the switch 78. The timer 114 is set to provide a predetermined "on" time for the device, and at the end of that time it momentarily closes a switch 115 that energizes the solenoid 116 of the valve 112, thereby opening the valve 112 and sending air from the compressor 60 to the shuttle valve 110, actuating the stop circuit automatically, just as does a momentary depression of the button 55. After the momentary closure of the switch 115 has actuated the stop circuit, the switch 115 opens and the timer 114 is ready to start again whenever the motor 80 starts.

To those skilled in the art to which this invention relates, many changes in procedure and widely differing embodiments and applications of the invention will suggest themselves without departing from the spirit and scope of the invention. The disclosures and the description herein are purely illustrative and are not intended to be in any sense limiting.

I claim:

1. A method for preparation of plastic foam by the pre-expansion technique, comprising
feeding liquid and gaseous ingredients at constant flow under pressure to a mixing zone,
mixing said ingredients in said mixing zone,
conducting the mixed ingredients from said mixing zone to a dispensing zone through a restriction zone passage in close proximity to said dispensing zone,
pneumatically regulating the width of said passage of said restriction zone so as to control the pressure of said mixing zone,
pneumatically closing said passage so as to shut off the flow of ingredients at said restriction zone between applications, for times short of the setting time for said plastic, while simultaneously shutting off the flow of said ingredients to said mixing zone, so as to retain a head of mixed material and so as to minimize wasting said material,
said pneumatic closing and said shutting off of the flow being accomplished automatically after a predetermined time interval.

2. A method for preparation of plastic foam by the pre-expansion technique, comprising
feeding liquid and gaseous ingredients at constant flow under pressure to a mixing zone,
mixing said ingredients in said mixing zone,
conducting the mixed ingredients from said mixing zone to a dispensing zone through a restriction zone passage in close proximity to said dispensing zone,
pneumatically regulating the width of said passage at said restriction zone so as to control the pressure of said mixing zone,
pneumatically closing said passage so as to shut off the flow of ingredients at said restriction zone between applications, for times short of the setting time for said plastic, while simultaneously shutting off the flow of said ingredients to said mixing zone, so as to retain a head of mixed material and so as to minimize wasting said material, and
flushing said mixing zone, restriction zone and dispensing zone at times between applications longer than said setting time, while fully opening said passage at said restricting zone,
said flushing being set to take place automatically at a predetermining time interval after closing said passage, unless said passage has been partially opened during said time interval.

3. Apparatus for the pre-expansion method of processing cellular plastic materials, comprising:
  walls defining a mixing chamber having inlet means for mutually reactive liquid ingredients of said plastic, for foaming gas, and for flushing solvent, and having an outlet,
  mixing means in said chamber,
  conduit means connected to said outlet,
  a restrictive valve having a solid core, a tubular elastomeric diaphragm therearound with a passage normally therebetween, and a housing providing a pressure chamber around said diaphragm, so that fluid in said chamber can force said diaphragm close to or against said core,
  an "on" valve means for sending fluid under regulated pressure to said pressure chamber of said restriction valve for providing a desired restriction in the passage between said diaphragm and said core, so as to build up pressure in said mixing chamber to a desired level,
  means connected to and controlled by said "on" valve means for simultaneously causing the passage of said reactive liquid ingredients and said foaming gas to said mixing chamber inlet means,
  "off" valve means for simultaneously (1) increasing the fluid pressure on said diaphragm and closing it tightly against said core, thereby to prevent flow of material through said valve and (2) stopping the flow of said reactive liquid and gaseous ingredients to said mixing chamber, and
  means for actuating said "off" valve means automatically after a predetermined "on" time.

4. Apparatus for the pre-expansion method of processing cellular plastic materials, comprising:
  walls defining a mixing chamber having inlet means for mutually reactive liquid ingredients of said plastic, for foaming gas, and for flushing solvent, and having an outlet,
  mixing means in said chamber,
  conduit means connected to said outlet,
  a restrictive valve having a solid core, a tubular elastomeric diaphragm therearound with a passage normally therebetween, and a housing providing a pressure chamber around said diaphragm, so that fluid in said chamber can force said diaphragm close to or against said core,
  an "on" valve means for sending fluid under regulated pressure to said pressure chamber of said restriction valve for providing a desired restriction in the passage between said diaphragm and said core, so as to build up pressure in said mixing chamber to a desired level,
  means connected to and controlled by said "on" valve means for simultaneously causing the passage of said reactive liquid ingredients and said foaming gas to said mixing chamber inlet means,
  "off" valve means for simultaneously (1) increasing the fluid pressure on said diaphragm and closing it tightly against said core, thereby to prevent flow of material through said valve and (2) stopping the flow of said reactive liquid and gaseous ingredients to said mixing chamber, and
  "flush" valve means for simultaneously acting, after said "off" valve has been actuated, to (1) reduce the fluid pressure on said diaphragm so that the pressure of ingredients opens it widely, and (2) send solvent to said mixing chamber and through said mixing chamber, conduit and valve to flush plastic therefrom before it sets.

5. The apparatus of claim 4 having means for automatically actuating said flush valve at a predetermined time after actuation of said "off" valve, unless said "on" valve has been actuated meanwhile.

6. Apparatus for the pre-expansion method of processing cellular plastic materials, comprising:
  walls defining a mixing chamber having separate inlets for two mutually reactive liquid ingredients of said plastic and additional separate inlets for foaming gas and for flushing solvent, and having an outlet,
  means for pumping each said liquid ingredient to its respective said inlet,
  means for supplying its inlet with foaming gas,
  means for supplying flushing solvent to its said inlet, when desired,
  mixing blades in said chamber and means for moving them to intermix the ingredients,
  conduit means connected to said outlet,
  a restriction valve having an hour-glass shaped solid core, a normally cylindrical elastomeric diaphragm therearound, and a housing providing a pneumatic pressure chamber around said diaphragm, so that said diaphragm can be forced close to or against said core,
  a source of air under pressure,
  an "on" valve means for sending air under regulated pressure to said restrictive valve for providing a desired restriction in the passage between said diaphragm and said core, so as to build up pressure in said mixing chamber to a desired level,
  first air-actuated means connected to and controlled by said "on" valve means for simultaneously causing said pumping means to send said reactive liquid ingredients to said mixing chamber inlets,
  second air-actuated means connected to and controlled by said "on" valve means for simultaneously sending said foaming gas at regulated amounts to said mixing chamber, and
  "off" valve means for simultaneously (1) increasing the pneumatic pressure on said diaphragm to an amount for closing it tightly against said core and thereby prevent flow of material through said valve, (2) stopping said pumping means and the flow of said reactive liquid ingredients to said mixing chamber, and (3) stopping the flow of said foaming gas to said mixing chamber.

7. The apparatus of claim 6 having "flush" valve means for simultaneously acting, after said "off" valve has been actuated, to (1) reduce the pneumatic pressure on said diaphragm so that the pressure of ingredients opens it widely, and (2) sending solvent to said mixing chamber and through chamber, conduit and valve to flush plastic therefrom before it sets.

8. The apparatus of claim 6 having timer means set for a predetermined time beginning each time said "on" valve means is actuated, normally closed valve means opened by said timer means at the end of said predetermined time, shuttle valve means for by-passing said "off" valve means, and conduit means connecting said source to said shuttle valve means through said normally-closed valve means of said timer.

References Cited by the Examiner
UNITED STATES PATENTS 2,847,196  8/58  Franklin et al. _____ 259—8
2,990,380  6/61  Auerbach et al. _____ 259—8

CHARLES A. WILLMUTH, *Primary Examiner.*